United States Patent [19]

Vezzini

[11] Patent Number: 5,754,028
[45] Date of Patent: May 19, 1998

[54] CHARGER FOR ELECTRICAL ENERGY ACCUMULATOR

[75] Inventor: Andrea Vezzini, Zürich, Switzerland

[73] Assignee: SMH Management Services AG, Biel, Switzerland

[21] Appl. No.: 659,216

[22] Filed: Jun. 5, 1996

[30] Foreign Application Priority Data

Jun. 16, 1995 [FR] France .................. 95 07234

[51] Int. Cl.[6] .............................. H01M 10/46
[52] U.S. Cl. ................... 320/6; 320/15; 320/49
[58] Field of Search .................. 320/6, 8, 15, 17, 320/18, 39, 49, 51; 363/20, 21

[56] References Cited

U.S. PATENT DOCUMENTS

| | | | |
|---|---|---|---|
| 4,227,139 | 10/1980 | Rosink et al. | 318/803 |
| 4,253,137 | 2/1981 | Rao | 363/21 |
| 4,763,238 | 8/1988 | Maige | 363/21 |
| 5,412,305 | 5/1995 | Jeanneret | 320/17 |

*Primary Examiner*—Edward Tso
*Attorney, Agent, or Firm*—Sughrue, Mion, Zinn, Macpeak & Seas, PLLC

[57] ABSTRACT

An electrical energy accumulator charger having a charging circuit for each cell or group of accumulator cells. Each charging circuit contains a flyback converter (CV1) which is supplied by a power source (5 to 12) providing continuous voltage having a sinusoidal form. Each converter has a transformer (T1) whose primary winding is mounted in series on the power source between two controllable semiconductors (14 and Th1). The blocking or unblocking of the converter (CV1) oscillations is controlled as a voltage of the cell or group of accumulator cells (1). Such an arrangement compensates for the disparities in maximum charge which the accumulator cells have when manufactured.

7 Claims, 2 Drawing Sheets

5,754,028

CHARGER FOR ELECTRICAL ENERGY ACCUMULATOR

BACKGROUND OF THE INVENTION

The present invention relates to a charger for rechargeable electrical accumulators of the type used for example in electric motor vehicles.

It is known that one of the most important factors which presently conditions the development of electrically driven vehicles, in particular for private use, lies in the ability of their power source to provide the greatest power possible for the greatest possible distance travelled. Indeed these parameters principally condition the vehicle's autonomy and consequently its cruising radius. Since the power source consists, either of a single accumulator periodically charged by a fixed charger, or in the case of a hybrid vehicle, of an accumulator coupled to an on board thermal power source via a charger, one understands that proper management of the charging/discharging cycles of the accumulator is a constant concern of the designers of this type of electrically driven vehicles.

A solution for improving the charging cycle of an accumulator of this type is disclosed in European patent application No 0 573 832 in the name of the applicant of the present patent application. The charger disclosed in that document enables above all the disparity of the maximum charging capacities of the cells of which it is formed to be compensated.

To this end, the cells of the accumulator are distributed in distinct groups each comprising at least one cell, each of these groups being connected to its own charging circuit, the charging circuits being supplied by a common electric power source. The charging process is divided into two phases during the first of which the charging circuits receive a current of constant intensity, while during the second phase a substantially constant voltage is applied thereto. The passage from the first to the second phase occurs from the moment when the voltage across the terminals of each of the groups of cells becomes greater than a predetermined reference voltage.

Thus, all the cells may be charged to their maximum capacity without running the risk of damaging the cell or cells with the lowest maximum charging capacity.

SUMMARY OF THE INVENTION

An aim of the invention is to provide a rechargeable accumulator charger which is an improvement on the one briefly described above and which enables the charging rate of an accumulator to be further increased, providing an excellent global output.

The invention thus concerns an electrical energy accumulator charger comprising several cells or groups of cells connected in series, this charger comprising, for each of these cells or groups of cells, a charging circuit intended to be supplied by an electric power source, said charging circuit comprising a transformer whose primary winding receives its electric power from said supply and whose secondary winding is connected to the accumulator cell or group of cells concerned via a rectifier, this charger being characterised in that said electric power source comprises supply means for providing a sinusoidal monopolar rectified voltage, in that said charging circuit comprises a flyback converter connected to said supply means and in that said charger further comprises means for measuring the voltage of each accumulator cell or group of cells and means for controlling the blocking and unblocking of the oscillations of the converter which is associated therewith as a function of the value of the voltage measured by said measuring means.

As a result of these features, the accumulator cells or groups of cells may all be charged to their maximum charge despite the disparity in the maximum charge values which they may have when they are manufactured. Furthermore, in the course of discharging, the invention enables the accumulator charge to be distributed evenly among all the cells of which it is formed.

Other features and advantages of the present invention will appear during the following description which is given solely by way of example with reference to the attached drawings in which:

DESCRIPTION OF PREFERRED EMBODIMENTS

Figure 1:
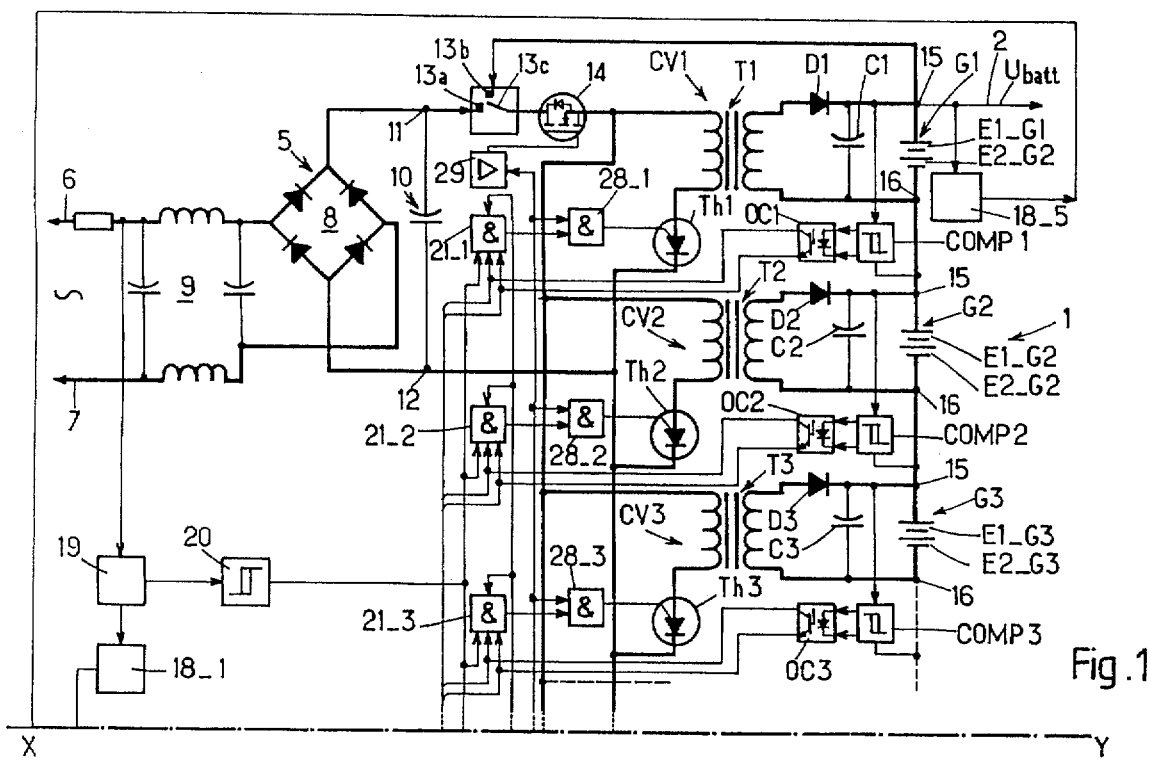
FIGS. 1 and 2, in juxtaposition, show a general diagram of a rechargeable accumulator charger according to the invention.

In these drawings, accumulator 1 is shown as being formed by a certain number of groups, G1, G2, ... Gn of one or several accumulator cells, for example E1-G1, E2-G1, E1-G2, E2-G2 ... E1-Gn, E2-Gn. The number of two cells per group is arbitrarily chosen here by way of example. Indeed, both the number of groups and the number of cells per group may be chosen freely as a function of general accumulator use criteria, which do not require further explanation here to enable the invention to be understood.

Cells E1-G1, E2-G1, E1-G2, E2-G2 ... E1-Gn, E2-Gn are all connected in series between a positive terminal 2 which is at a potential Ubatt, and a negative terminal 3 which is at the potential of earth. However, a dropping resistor 4 for measuring current intensity, whose role will be described below, is connected between cell E2-Gn and earth.

The charger comprises a rectifier 5 intended to be connected via its terminals 6 and 7 to an ac power source (not shown). In the event that, according to one of the numerous practical applications of the invention, the charger equips an electrically driven motor vehicle, the ac supply may be the public supply system, the counterpart of which is that the vehicle will be immobilised to charge its accumulator. If, on the contrary, it is a hybrid vehicle, equipped with a generator driven by an internal combustion engine, the ac supply may be this generator.

Rectifier 5 comprises a diode bridge 8 connected, on the ac current side, to a filter 9, which is connected to terminals 6 and 7. On the dc current side, bridge 8 is connected in parallel to a charging capacitor 10, across terminals 11 and 12 of which appears a dc output voltage having a sinusoidal form.

Output terminal 11 of rectifier 5 is connected to one of the fixed poles 13a of an inverter switch 13 enabling the operating mode of the charger to be changed. The role of this inverter switch will be explained below. The mobile contact 13c of inverter switch 13 is connected to one of the ends of the main conduction path of a semiconductor power component 14, for example an IGBT type component. In the preferred embodiment of the invention, the other end of this path is commonly connected to the primary windings of n transformers T1 to Tn, i.e. as many transformers as there are groups of cells in accumulator 1. In an alternative embodiment, semiconductor components of this type may respectively be connected in series to each of the primary windings.

According to the embodiment shown, the primary windings of transformers T1 to Tn are also connected to the respective anodes of thyristors Th1 to Thn, all of whose cathodes are commonly connected and to terminal 12 of rectifier 5.

The secondary windings of transformers T1 to Tn are connected respectively in parallel to series mountings formed of rectifier diodes D1 to Dn and of capacitors C1 to Cn. In each of these series mountings, the junction between the diode and the capacitors is connected to the positive pole 15 of the group of accumulator cells concerned, while the connecting point of the capacitor and the secondary winding of the transformer is connected to the negative pole 16 of this group. For example, as regards group G2, the junction between diode D2 and capacitor C2 is connected to terminal 15 which constitutes the positive pole of cells E1-G2 and E2-G2, while the connecting point between the secondary winding of transformer T2 and capacitor C2 is connected to terminal 16 which is the negative pole of cells E1-G2 and E2-G2. It will be noted that terminal 15, which is connected to the junction between diode D1 and capacitor C1, is at the same time the positive output terminal 2 of the charger. Furthermore, terminal 16 which forms the negative pole of group of cells Gn is connected to the connecting point between the secondary winding of transformer Tn and capacitor Cn via dropping resistor 4.

Figure 2:
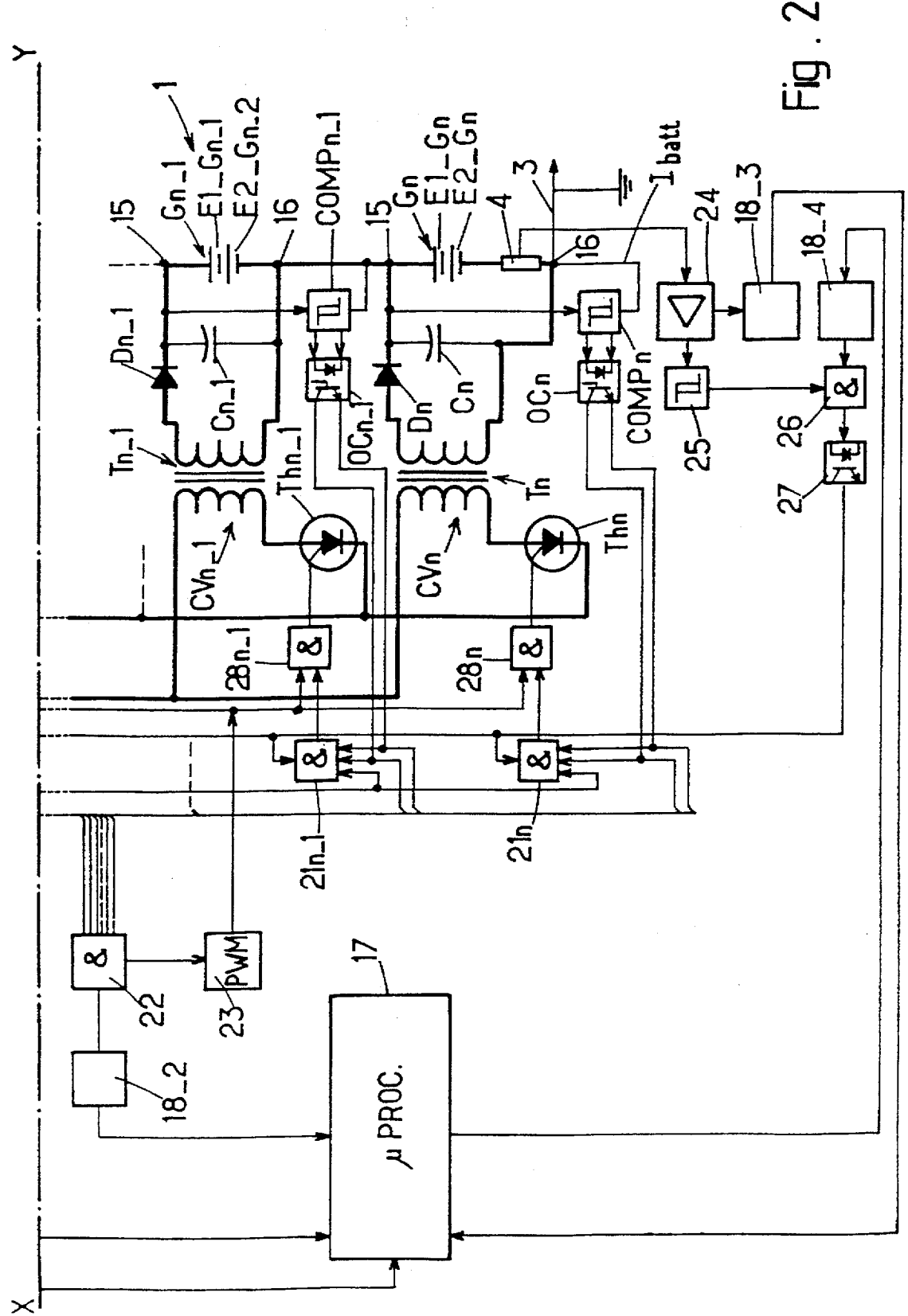

The circuits comprising respectively one of transformers T1 to Tn, one of thyristors Th1 to Thn, one of diodes D1 to Dn and one of capacitors C1 to Cn, form together with semiconductor power component 14 (which is common to all these circuits), as many converters, called "flyback converters" by the experts. In FIGS. 1 and 2, these converters have been given the respective general references CV1 to CVn and they will simply be called "converter" in the description which follows.

As can be seen, these converters are of simple design and assure an efficient magnetic coupling, while being controlled by a common switching component 14. Each converter may be switched off by its own thyristor Th1 to Thn. As is the case on the supply side, the converters are connected in parallel, there is only a variation in the amplitude of the current flowing in semiconductor power component 14, when thyristors Th1 to Thn switch off their respective converters, the current amplitude in the other converters remaining thus unchanged in this case. Thus, the converters do not influence each other and the control (conduction interval) of the semiconductor component is independent of the number of converters of the charger.

Furthermore, it will be noted that all the converters are decoupled from each other, both galvanically and magnetically, so that they may be directly connected to the group of accumulator cells which they are intended to supply.

In each converter CV1 to Cvn, diode D1 to Dn may be any suitable silicon type diode. However, the use of Schottky type diodes, which have relatively high blocking voltages is preferred.

It will also be noted that the role of capacitors C1 to Cn is to reduce the peaks of current flowing in the accumulator cells. They may have a low value. In certain cases, as a function of the capacitive value of these cells, they may even be completely omitted.

Each converter CV1 to CVn comprises a comparator circuit COMP1 to COMPn responsible for monitoring the voltage of the group of accumulator cells supplied by this converter. Each comparator circuit receives its supply power from the group of cells with which it is associated. In the embodiment shown here in which it is envisaged to control accurately both the charging and the discharging of the accumulator, each comparator circuit COMP1 to COMPn comprises two comparators which compare the voltage of the respective group of cells G1 to Gn to two reference voltages, namely: first higher reference voltage Us1 which corresponds to the full charge value, and a second lower reference voltage Us2 corresponding to a value after which, during discharging, the charge of a given group of cells must be compensated with the aid of the charge of other groups of cells. The process utilising these reference voltages will be described below.

The two reference voltages have an hysteresis which may be chosen of equal values, but which must compensate at least the internal resistance of the group of cells concerned.

It is to noted that each comparator circuit may also monitor other operating parameters of the accumulator, for example comparing its temperature to a reference temperature or comparing a certain charging or discharging period to a reference period of time. An alternative embodiment of this type may be significant for accumulators of types other than lead. It is also possible to make the reference voltages Us1 and Us2 at which the comparator circuit reacts, dependent on the temperature, by using for this purpose appropriate resistors whose resistivity is a function of the temperature.

The output of each comparator circuit COMP1 to COMPn is respectively connected to an optocoupler OC1 to OCn which assures its galvanic decoupling with the part of the charger situated on the supply side.

The charger functioning control is assured by a logic circuit comprising, at least in the embodiment shown, a suitably programmed microprocessor 17 and several discrete circuits having AND logical functions. However, the man skilled in the art will understand that the functions assured by the latter may also be implemented by microprocessor 17 by incorporating them in the programme of the latter, this way of constructing the charger being in fact preferred to a partial embodiment with the aid of discrete circuits.

In FIGS. 1 and 2, microprocessor 17 is connected to interfaces 18-1 to 18-5 via which it communicates with the other charger components.

Interface 18-1 is connected to a circuit 19 for measuring the supply voltage present across terminals 6 and 7. This measuring circuit 19 is also connected to a threshold circuit 20 whose output is commonly connected to a first input of several AND gates, 21-1 to 21n, respectively associated with converters CV1 to CVn. Threshold circuit 20 enables the charger to operate at a supply voltage situated within a determined range.

Interface 18-2 is connected to the output of an AND gate 22 having several inputs which are respectively connected to optocouplers OC1 to OCn of converters CV1 to CVn. AND gate 22 comprises another output which is connected to a control pulse width controlling circuit 23, on the one hand of semiconductor component 14 and, on the other hand, of each of thyristors Th1 to Thn.

Interface 18-3 is connected to the output of an amplifier 24 whose input is connected to dropping resistor 4. This amplifier thus provides data on current Ibatt flowing in the accumulator. The same signal is applied to a threshold detector 25.

Interface 18-4 is connected to microprocessor 17 for receiving therefrom control data generated from the signals which are applied thereto by the other interfaces and also from other control criteria which are not described here. Interface 18-4 provides a signal to the first input of an AND gate 26 which receives at its other input the signal provided by threshold detector 25. The output of AND gate 26 is connected to optocoupler 27 whose output is connected in parallel to an input of AND gates 21-1 to 21n.

Interface 18-5 is connected between microprocessor 17 and terminal 2 of the charger for transmitting thereto the signal Ubatt.

AND gates ET 21-1 to 21-n are connected via one of their inputs to the output of threshold circuit 20. Other inputs of these AND gates are respectively connected to optocouplers OC1 to OCn. Their outputs are respectively connected to an input of AND gates 28-1 to 28-n whose other inputs are respectively connected to the outputs of AND gates 21-1 to 21-n. The other inputs of AND gates 28-1 to 28-n are connected together at the output of controlling circuit 23. The outputs of AND gates 28-1 to 28-n are respectively connected to the control electrodes of thyristors Th1 to Thn.

The control electrode of semiconductor power component 14 is connected to the output of an amplifier 29 whose input is also connected to the output of controlling circuit 23.

Finally, terminal 2 of the charger is connected to fixed contact 13b of inverter switch 13.

The operation of this charger is as follows.

A. Accumulator charging mode

In this mode, inverter switch 13 is in the "Charge" position, i.e. its mobile contact 13c is placed on fixed contact 13a.

At the beginning of the charge, semiconductor power component 14 and thyristors Th1 to Thn are conducting for the duration of the control pulses provided by control circuit 23 during each half alternation of the rectified supply voltage provided by rectifier bridge 8. Under these conditions, this voltage is directly applied to the primary windings of transformers T1 to Tn of converters CV1 to CVn.

The resulting currents in these primary windings increase in a linear manner magnetising their inductance. Since the duration of conduction of component 14 is kept constant during each half alternation, the amplitude of these currents until the moment when the component is made non-conducting is directly proportional to the supply voltage and the shape of the currents is thus also sinusoidal. Filter 9 ensures that the voltage harmonics cannot be sent back into the power source connected across terminals 6 and 7. Furthermore, the absorbed current and voltage are practically in phase so that this power source is practically uncharged by reactive components.

During the conduction period of component 14, the voltage across the primary winding of transformers T1 to Tn is transferred to the secondary windings of the latter. However, because of the opposite winding directions of the respective primary and secondary windings and also because of the presence of respective diodes D1 to Dn, no current can flow in the secondary windings and consequently in the accumulator. When at the end of a control pulse provided by control circuit 23, the semiconductor power component is blocked, the current in the primary windings is abruptly interrupted, which induces an inverse voltage in the secondary windings. This voltage increases until respective diodes D1 to Dn begin to conduct. From this moment, the power accumulated in the magnetic circuits of transformers T1 to Tn is dissipated in groups of cells G1 to Gn of the accumulator, the current in the secondary windings decreasing in a linear manner practically until zero. After a short rest period, this process can be repeated during the following half alternation of the supply voltage.

The process ends for each group of cells G1 to Gn when its voltage (terminals 15 and 16) reach the first reference voltage Us1. At this moment, the comparator circuit, COMP1 to COMPn, of this group provides an output signal which is applied via the corresponding optocoupler, CO1 to COn, to the corresponding AND gate 21-1 to 21n. The latter transmits it to the AND gate 28-1 to 28n which is connected thereto. The output signal from the latter gate makes the thyristor Th1 to Thn of the converter CV1 to CVn concerned non-conducting and thus the charging of this group of cells temporarily stops.

When all the groups of cells have reached a voltage equal to first reference voltage Us1 and consequently all the converters are switched off, microprocessor 17 adjusts control circuit 23 so that the charging current is henceforth fixed at a lower intensity. This may occur via a reduction in the duration of the control pulses provided by this control circuit 23.

Since the charging mode is temporarily interrupted, the voltages of the groups of accumulator cells are slightly lowered because of a known hysteresis phenomenon. As soon as the voltage across the terminals of a group of cells decreases below the value fixed by the respective comparator circuit COMP1 to COMPn, the corresponding converter CV1 to CVn is unblocked, since its thyristor Th1 to Thn, is thus again made to conduct. The group of cells supplied by the converter in question may thus complete its charging with the aid of a charging current of a lower intensity. A lower voltage drop results across the terminals of the internal resistance of this group of cells and when the final charging voltage is again reached (voltage Us1), the charge of this group of cells has increased.

When all the groups have again reached a voltage corresponding to voltage Us1, the process may be repeated several times with a charging current of lower and lower intensity. The consequence of each iteration is that the overall accumulator charge increases to its maximum capacity, the cells with the greatest maximum capacities thus also having received their complete charging level.

It is thus seen that the process according to the invention enables the disparities in capacity which the cells of an accumulator have because of inevitable manufacturing tolerances to be compensated. The total charging duration corresponds to the charging duration of the group of cells having the greatest charging capacity.

B. Accumulator discharging a mode

According to a particularly advantageous feature of the invention, the charger enables a compensation of the charging level of the accumulator cells to be achieved amongst each other, by using for this purpose the same process as that which has just been described in relation to the charging mode.

To this end, during discharging, inverter switch 13 is placed so that its mobile contact 13b is applied on its fixed contact 13b. Under these conditions, the voltage of terminal 2 is applied to power component 14 so that the accumulator itself can supply converters CV1 to CVn.

The charging level compensation essentially aims to relieve the accumulator cells having, when manufactured, a lower maximum capacity and thereby to increase the apparent capacity. To this end the invention intends to carry over in some way the capacity of the cells having the largest capacity to those having the lowest capacity.

Thus during the discharging mode, each comparator circuit COMP1 to COMPn monitors the voltage of its associated group of cells by comparing it to reference voltage Us2 which is fixed at a value after which it is considered that the charge of a group of cells should be compensated by the charge of other groups of cells.

If during discharging, the voltage of a given group decreases below voltage Us2, converter CV1 to CVn which is associated with it is unblocked by the fact that its thyristor Th1 to Thn is made to conduct. A converter thus unblocked will operate in the same way as during the charging process except that it is the groups of accumulator cells having the greatest capacity at the moment in question which will compensate the lack of charge of the group or groups of cells for which the converter is operated.

It will be noted that the transformer magnetic circuit magnetisation energy of such an active converter is taken from all of the accumulator cells. However, as long as the number of cells with lower capacity is less than the number of cells with greater capacity, power is supplied to the cells connected to the unblocked converter(s) during the demagnetisation phase of the corresponding magnetic circuit(s).

As soon as an equilibrium is again reached among all the charging levels, all the converters are blocked and all the groups of cells then provide power to the current consumer which is connected to the accumulator.

This current compensation process may be repeated several times during the course of discharging and has notable advantages. First, the overall apparent maximum capacity of the accumulator is higher since the cells having a comparatively lower maximum capacity are discharged more slowly and reach the minimum admissible capacity for the health of the accumulator, at the same time as those which have a comparatively higher maximum capacity. The accumulator is thus discharged more regularly and more evenly for all of its cells.

Furthermore, as one knows that generally an accumulator should not be completely discharged but kept at a certain residual charge (from 20 to 40% of the maximum possible charge), it is important to monitor this minimum admissible level very accurately. This requirement is crucial for example for a very intensive use with very frequent charging/discharging cycles, as in the case of electric motor vehicles. Thanks to the invention, and in particular to the fact that discharging is in constant equilibrium among all the accumulator cells, this monitoring may simply be done by checking voltage Ubatt across the accumulator terminals, this voltage being thus a parameter representative of the charging level of all the cells.

It is also to be noted that lower reference voltage Us2 fixed in comparator circuits COMP1 to COMPn may be used to control easily the minimum charging level which one wishes to impose on the accumulator.

The invention also enables the state of the accumulator cells to be monitored. In order to do this, microprocessor 17 is programmed to count the number of times that each group of cells is coupled to its associated converter during the discharging conditions. The higher this number is in relation to those taken for the other groups of cells, the more the quality of the group of cells in question will deteriorate.

A charger designed according to the invention may, solely by way of example, comprise the following components:

Rectifier 8
    General Instruments GBU8G
Transformers T1 to Tn
    Siemens, core ETD-49, N27, Maximum induction 240 mT
Power semiconductor component 14
    Mitsubishi IGBT, 1200V, 8 A
Thyristors Th1 to Thn
    Texas Instruments 800V, 4 A
Diodes D1 to Dn
    Schottky diodes 30V, 10 A, peak inverse voltage 35V
Optocouplers OC1 to OCn 27
    Siemens ILCT6, Dual
Comparator circuits COMP1 to COMPn
    LM339N, QUAD
Microprocessor 17
    RISC Microchips 1651 and 1671

What is claimed is:

1. An electrical energy accumulator charger comprising several cells or groups of cells connected in series, said charger comprising, for each of said cells or groups of cells, a charging circuit adapted to be supplied by an electric power source, said charging circuit comprising a transformer whose primary winding receives its electric power from said source and whose secondary winding is connected via a rectifier to the accumulator cell or group of cells concerned, wherein said electric power source comprises supply means for providing a monopolar rectified voltage having a sinusoidal aspect or form, wherein said charging circuit comprises a flyback converter connected to said supply means, wherein said charger further comprises means for measuring the voltage of each accumulator cell or group of cells and means for controlling the blocking and unblocking of oscillations of the converter as a function of the value of the voltage measured by said measuring means, wherein each converter comprises said transformer and said rectifier and at least a first controllable semiconductor element connected, in series with the primary winding of said transformer, to said supply means, and wherein said primary winding of each transformer is connected, in series between said first controllable semiconductor element and a second controllable semiconductor element, to said supply means.

2. A charger according to claim 1, wherein one said controllable semiconductor element is common to all the converters.

3. A charger according to claim 1 or claim 2, further comprising switching means for enabling said converters to be connected, either to said supply means during the charging mode of said accumulator, or to a terminal of the accumulator during its discharging mode.

4. An electrical energy accumulator charger for charging several cells or groups of cells connected in series, said charger comprising:

an electric power source, and for each of said cells or groups of cells, a charging circuit which comprises
    a flyback converter having
        a rectifier,
        a transformer
            whose primary winding is connected to said electric power source, and
            whose secondary winding is connected via said rectifier to the accumulator cell or group of cells concerned, and
        at least a first controllable semiconductor element connected, in series with said primary winding, to said electric power source;

wherein said charger further comprises
means for measuring the voltage of each accumulator cell or group of cells, and means for controlling the blocking and unblocking of each said first controllable semiconductor element and each said flyback converter as a function of the value of the voltage of each accumulator cell or group of cells measured by said measuring means; and wherein said primary winding of each transformer is connected, in series between said first controllable semiconductor element and a second controllable semiconductor element, to said electric power source.

5. A charger according to claim 4, wherein one said controllable semiconductor element is common to all the flyback converters.

6. A charger according to claim 5, wherein said electric power source provides a monopolar rectified voltage having a substantially sinusoidal aspect or form.

7. A charger according to any one of claims 4 to 6, further comprising switching means for enabling the flyback converters to be connected, either to said electric power source during a charging mode of said accumulator, or to a terminal of the accumulator during its discharging mode.

* * * * *